3,096,291
PROCESS OF PREPARING DRY GRANULAR COMPOSITIONS
Paul J. Schauer and Riley N. Weston, St. Louis County, Mo., assignors to Monsanto Chemical Company, St. Louis, Mo., a corporation of Delaware
No Drawing. Filed Jan. 2, 1959, Ser. No. 784,471
6 Claims. (Cl. 252—99)

This invention relates to the preparation of dry stable granular compositions comprising dichloroisocyanuric acid and sodium tripolyphosphate hexahydrate which compositions dissolve rapidly in water to produce clear solutions of strong bleaching, disinfecting and germicidal action.

In accordance with this invention it has been found that upon intimately mixing powdered anhydrous dichloroisocyanuric acid and anhydrous granular sodium tripolyphosphate and thereafter mixing water therewith in the form of droplets and in certain well-defined proportions and then heating the agglomerated solids to reduce the water content thereof, there is obtained a dry stable granular composition comprising dichloroisocyanuric acid and sodium tripolyphosphate hexahydrate which compositions dissolve rapidly in water to produce clear solutions of strong bleaching, disinfecting and germicidal action.

In the process of this invention the following proportions in parts by weight will be used to prepare the granular product.

5 to 50 parts dichloroisocyanuric acid, anhydrous powder
40 to 85 parts sodium tripolyphosphate, anhydrous granular
10 to 17 parts water the components being so selected that they add up to 100 parts by weight.

The dichloroisocyanuric acid component used will be anhydrous (i.e. contain less than about 1% by weight of water) and powdery, i.e. 90% or more will pass through 100 mesh screen.

The sodium tripolyphosphate component used will be anhydrous (i.e. contain less than about 1% by weight of water) and granular, i.e. 98% or more will pass through 20 mesh screen and 98% or more will be retained on 100 mesh screen. This salt exists in two forms designated as $Na_5P_3O_{10}$ I and $Na_5P_3O_{10}$ II as described in volume 63, Journal of the American Chemical Society, pp. 461–462. In this invention either form can be used or any mixture thereof.

The respective materials, i.e. anhydrous powdered dichloroisocyanuric acid and granular anhydrous sodium tripolyphosphate are brought together and intimately mixed in any desired fashion and while mixing same the water is applied in the form of droplets as for example by spraying water on the mixing mass. It is preferred that the mixing of the three components take place at about room temperature however temperatures in the range of 10° C. to 50° C. can be employed. The agglomerated mass so obtained is then heated at about 50° C. to about 90° C. to reduce the water content to that in the range of 1 to 10% by weight of the total mass. It is preferred that the agglomerated solids be aged for at least 6 hours at about room temperature prior to heating the solids to reduce the water content.

During the mixing and heating operation a reaction takes place producing sodium dichloroisocyanurate and a sodium acid tripolyphosphate having the empirical formula:

$$Na_{5-n}H_nP_3O_{10} \cdot XH_2O$$

wherein $n$ is a whole number from 1 to 4, usually 1 or 2, and wherein $X$ is an integer from 0 to 2. In this reaction the hydrates of sodium dichloroisocyanurate form preferentially, the dihydrate of sodium dichloroisocyanurate forming preferentially to the monohydrate. In this reaction the amount of sodium dichloroisocyanurate as sodium and the amount of sodium acid tripolyphosphate as sodium will be equal, in other words for each sodium atom given up by anhydrous granular sodium tripolyphosphate one molecular proportion of dichloroisocyanuric acid is converted to the sodium salt thereof.

While the extent of the reaction is dependent upon the rate of mixing, type of mixer, temperature of mixing, the respective amounts of the three ingredients originally present, and the subsequent heating operation or aging and heating operation the granular product obtained will in general be characterized by the following proportions in parts by weight.

2.5 to 40 parts dichloroisocyanuric acid [1]
2.7 to 35 parts sodium dichloroisocyanurate [1]
4.2 to 55 parts sodium acid tripolyphosphate [1]
28.4 to 56 parts sodium tripolyphosphate [1]
1 to 10 parts water, actually water of hydration

[1] Anhydrous basis.

the respective components adding up to 100 parts by weight. When the preferred amounts of anhydrous powdery dichloroisocyanuric acid and granular anhydrous sodium tripolyphosphate (i.e. a like or unlike amount in the range of 40 to 50 parts by weight of each) are mixed together and then with 10 to 17 parts by weight of water and heated or aged and then heated as aforedescribed in general the granular composition obtained will contain in parts by weight.

22 to 42.8 parts dichloroisocyanuric acid [1]
8 to 20 parts sodium dichloroisocyanurate [1]
12.6 to 31.5 parts sodium acid tripolyphosphate [1]
16.6 to 36.6 parts sodium tripolyphosphate [1]
5 to 10 parts water, actually water of hydration

[1] Anhydrous basis.

the respective amounts adding up to 100 parts by weight.

As illustrative of the process of this invention is the following:

*Example I*

To a rotating drum at room temperature is added and intimately mixed 41 parts by weight of anhydrous powdery dichloroisocyanuric acid (100% passed through 100 mesh screen) and 45 parts by weight of anhydrous granular sodium tripolyphosphate (100% passed through 20 mesh and 100% was retained on 100 mesh). After about 5 minutes of mixing and while continuing the mixing 14 parts of water is sprayed onto the mixture. Upon completion of the water addition the mass is mixed for an additional 5 minutes. The granules or agglomerates are then removed from the drum and placed in a hot air circulating oven and heated at 70° C. solids temperature for about 30 minutes and then permitted to cool to room temperature. This non-dusty granular product contains the following percentage by weight.

35% dichloroisocyanuric acid
10% sodium dichloroisocyanurate monohydrate
3% sodium dichloroisocyanurate dihydrate
19% sodium acid tripolyphosphate, $Na_4HP_3O_{10}$
33% sodium tripolyphosphate hexahydrate The available chlorine content of the granular product is 27.1%. This product is very stable under normal storage conditions.

*Example II*

To a rotating drum at room temperature is added and intimately mixed 44.7 parts by weight of anhydrous powdery dichloroisocyanuric acid of Example I and 41.3 parts by weight of anhydrous granular sodium tripolyphosphate of Example I. After about 5 minutes of mixing and while continuing the mixing 14 parts by weight of water is sprayed onto the mixture. Upon completion of the water addition the granular product is mixed for about 5 minutes. The product is then permitted to stand at room temperature for 24 hours and then heated in a hot air circulating oven at 70° C. solids temperature for 30 minutes and then permitted to cool to room temperature. The non-dusty granular product contains the following in percent by weight.

34% dichloroisocyanuric acid
10% sodium dichloroisocyanurate monohydrate
3% sodium dichloroisocyanurate dihydrate
19% sodium acid tripolyphosphate $Na_4HP_3O_{10}$
34% sodium tripolyphosphate hexahydrate The available chlorine content of the granular product is 32.64%. This product is very stable under normal storage conditions.

Any means or apparatus other than a rotary drum as set forth in the examples can be employed provided an intimate mixing of the respective constituents results.

The product obtained as aforementioned is granular and non-dusty and is in general of slightly larger particle size than that of the anhydrous granular sodium tripolyphosphate charged.

What is claimed is:

1. The process of preparing a dry, stable granular product comprising dichloroisocyanuric acid and sodium tripolyphosphate hexahydrate which comprises adding and mixing water droplets with an intimate mixture of powdery anhydrous dichloroisocyanuric acid and granular anhydrous sodium tripolyphosphate of a size such that 98% will pass through a 20 mesh screen and at least 98% will be retained on a 100 mesh screen and thereafter heating the granular product at a temperature in the range of 50° C. to 90° C., the amounts of said materials in parts by weight being as follows:

40 to 85 parts sodium tripolyphosphate
5 to 50 parts dichloroisocyanuric acid
10 to 17 parts water wherein the parts are so selected as to total 100 parts.

2. The process of claim 1 wherein the water droplets are mixed with the intimate mixture of dichloroisocyanuric acid and sodium tripolyphosphate at a temperature in the range of 10° C. to 50° C.

3. The process of claim 1 wherein the water droplets are mixed with the intimate mixture of dichloroisocyanuric acid and sodium tripolyphosphate at room temperature.

4. The process of claim 1 wherein the mix obtained upon mixing the water droplets with the intimate mixture of dichloroisocyanuric acid and sodium tripolyphosphate is aged at room temperature for at least 6 hours prior to the heating operation.

5. The process of preparing a dry stable granular product containing dichloroisocyanuric acid and sodium tripolyphosphate hexahydrate as two of the essential ingredients thereof which comprises adding and mixing water droplets with an intimate mixture consisting essentially of (1) powdery dichloroisocyanuric acid containing less than 1% by weight of $H_2O$ and of a particle size such that at least 90% will pass through a 100 mesh screen and (2) granular anhydrous sodium tripolyphosphate of a size such that 98% will pass through a 20 mesh screen and at least 98% will be retained on a 100 mesh screen, said admixing being carried out at a temperature of about 10° C. to about 50° C. until granules of the mixed materials are obtained and thereafter heating said granules to a temperature of about 50° C. to about 90° C. until granules containing dichloroisocyanuric acid, sodium tripolyphosphate hexahydrate, sodium dichloroisocyanurate and sodium acid tripolyphosphate are formed and the granules contain from about 1% to 10% by weight of water as water of hydration, the amounts of the materials, in parts by weight, initially mixed together being as follows:

40 to 85 parts of said granular sodium tripolyphosphate
5 to 50 parts of said powdery dichloroisocyanuric acid and
10 to 17 parts of water droplets, wherein the total parts of said materials is 100 parts.

6. The process of claim 5 wherein the mix obtained after completion of the water droplet addition is aged at room temperature for at least 6 hours prior to the heating operation.

References Cited in the file of this patent

UNITED STATES PATENTS

| | | |
|---|---|---|
| 1,988,991 | Albertshauser | Jan. 22, 1935 |
| 2,195,757 | Robson et al. | Apr. 2, 1940 |
| 2,524,394 | Madorsky | Oct. 3, 1950 |
| 2,578,270 | Strain | Dec. 11, 1951 |
| 2,607,738 | Hardy | Aug. 19, 1952 |
| 2,767,146 | Bonewitz et al. | Oct. 16, 1956 |
| 2,795,556 | Quinn | June 11, 1957 |
| 2,815,311 | Ellis et al. | Dec. 3, 1957 |
| 2,828,308 | Lorenz | Mar. 25, 1958 |
| 2,874,123 | Schaafsma et al. | Feb. 17, 1959 |
| 2,913,460 | Brown et al. | Nov. 17, 1959 |

FOREIGN PATENTS

| | | |
|---|---|---|
| 551,308 | Belgium | Mar. 26, 1957 |
| 219,930 | Australia | Jan. 22, 1959 |